United States Patent [19]

Periou et al.

[11] Patent Number: 5,787,755
[45] Date of Patent: Aug. 4, 1998

[54] MOTORIZED REDUCTION GEAR INTENDED IN PARTICULAR FOR A VEHICLE ELECTRIC WINDOW LIFTER

[75] Inventors: Pierre Periou, Cergy Pontoise; Enrico Fin, Paris, both of France

[73] Assignee: Meritor Light Vehicle Systems-France, France

[21] Appl. No.: 880,572

[22] Filed: Jun. 23, 1997

Related U.S. Application Data

[63] Continuation of Ser. No. 611,606, Mar. 8, 1996, abandoned, which is a continuation of Ser. No. 169,815, Dec. 17, 1993, abandoned.

[30] Foreign Application Priority Data

Dec. 21, 1992 [FR] France ................... 9215417

[51] Int. Cl.$^6$ .................................................. F16H 57/00
[52] U.S. Cl. .................................................. 74/411; 464/84
[58] Field of Search ........................... 74/411; 192/8 R; 464/77, 84, 101, 185

[56] References Cited

U.S. PATENT DOCUMENTS

| 2,841,000 | 7/1958 | Parks et al. . | |
|---|---|---|---|
| 3,362,512 | 1/1968 | Ericson | 464/77 |
| 3,984,998 | 10/1976 | Rogakos et al. | 464/77 |
| 4,480,736 | 11/1984 | Loizeau | 464/77 |
| 4,790,793 | 12/1988 | Bacardit | 464/77 |

FOREIGN PATENT DOCUMENTS

| 0219398A1 | 4/1987 | European Pat. Off. . | |
|---|---|---|---|
| 137404 | 12/1929 | France . | |
| 3403259C1 | 8/1985 | Germany . | |
| 268290 | 10/1929 | Italy | 464/84 |

Primary Examiner—Charles A. Marmor
Assistant Examiner—David M. Fenstermacher

[57] ABSTRACT

This motorized reduction gear includes a toothed wheel (1) for driving an output member mounted on its hub (4), and one or more damping springs (6) interposed between the wheel (1) and the output member; the damping spring(s) (6) is(are) flat and metal and formed of two flexible branches (7) which are symmetrical with one another with respect to a median plane; each branch includes a convolution, a first section (8) of which extends around the hub (4), is extended by a fold (11), and a second section (9) terminated by a radial segment (12), a flat (13) for bearing on a rib (17) of the wheel (1), and a claw (14) for holding the spring in the wheel (1), around the hub (4). When the window pane comes to rest in abutment at the end of its path, one of the branches (7) is compressed and moves closer to the other, damping out the halting in the rotation of the toothed wheel (1). This(these) spring(s) has(have) a small overall size and high operational stability.

8 Claims, 3 Drawing Sheets

MOTORIZED REDUCTION GEAR INTENDED IN PARTICULAR FOR A VEHICLE ELECTRIC WINDOW LIFTER

This application is a continuation of Ser. No. 08/611,606 filed Mar. 8, 1996, and now abandoned which is a continuation of Ser. No. 08/169,815, filed Dec. 17, 1993, and now abandoned.

The subject of the present invention is a motorized reduction gear, intended to drive an element connected to its output shaft, in particular a vehicle electric window lifter.

It is known, that at the end of its path, the window pane driven by an electric window lifter encounters a stop. It is therefore brought to rest abruptly, whilst the motor at that instant has very high momentum owing to its rotational speed. This momentum must be absorbed by an element inside the reduction gear. In general, this element is located between the wheel of the worm of the reduction gear and the output of the motorized reduction gear. Very often this function is fulfilled by rubber or plastic dampers as described in patent DE-A-3,403,259.

The operational stability of this type of damper deteriorates and its sensitivity decreases owing, on the one hand, to aging and, on the other hand, to the harmful effect of temperature variations.

What is more, these dampers are relatively bulky and therefore require a lot of space.

The document CH-A 137,404 describes an elastic wheel for transmitting movement, comprising a bundle of annular spring leaves arranged, over the greater part of their length, bearing on a shell or ring. As a result, these spring leaves cannot deform freely, and their small deformation when the driven member comes into abutment stores only a reduced part of all of the kinetic energy.

The object of the invention is to propose a motorized reduction gear equipped with dampers which do not exhibit these drawbacks.

The motorized reduction gear envisaged by the invention is of the type including a toothed driving wheel, an output member fitted onto a hub of the wheel, and damping means interposed between the wheel and the output member.

In accordance with the invention, the damping means consist of at least one flat metal spring arranged so that it can deform freely and can store up all of the kinetic energy.

The use of metal materials to constitute the damper or dampers gives these relative insensitivity to aging and to thermal effects, whilst its flat shape substantially decreases its overall size.

According to one embodiment of the invention, the spring is formed of two flexible branches which are symmetrical with one another with respect to a median plane, and each branch includes a convolution, a first section of which is shaped to bear on the hub, and a second, curved, section, connected by a fold to the first section has a terminal part which is cut so as to constitute a flat, perpendicular to the plane of the spring, and adapted to act as bearing for pieces of the toothed wheel and of the output member, such as coaxial circular ribs.

It is possible to use either a single flat spring, suitably dimensioned, or two or more springs distributed over the periphery of the hub of the wheel.

Other features and advantages of the invention will emerge during the description which will follow, given in reference to the appended drawings which illustrate one embodiment thereof by way of a non-limiting example.

Figure 1:
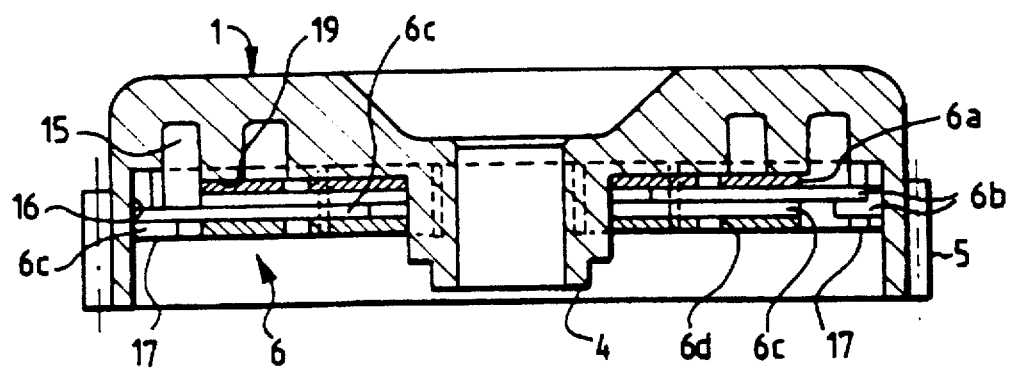
FIG. 1 is a diametral section on 1/1 of FIG. 2, of a toothed wheel of an electric motorized reduction gear, internally equipped with a flat damping spring according to the invention.

The motorized reduction gear for driving the window pane in a vehicle electric window lifter is of a type known per se, and which does not require any detailed description.

This motorized reduction gear comprises a toothed wheel 1 for driving an output member 2 pierced with an axial orifice, or central passage, 3 allowing it to be fitted onto a hub 4 of the wheel 1. The wheel 1 is provided with toothing 5 interacting with a worm which is not represented and is equipped, on its inner face surrounding the hub 4 with a flat metal spring 6a arranged around the hub 4. This spring 6a is formed of two flexible branches 7, which are symmetrical with one another with respect to a median plane P perpendicular to the plane of the spring 6a. Each branch 7 has a convolution, a curved first section 8 of which extends substantially over half a circumference of the hub 4 whose contour it matches, thereby bearing on it, and a second curved section 9 connected by a fold 11 to the first section 8.

Each second section 9, which extends more or less coaxially to the first section 8, is extended by a radial segment 12, located in the overall plane of the spring 6a. Each segment 12 is itself extended by a terminal part which is cut so as to constitute a flat 13 perpendicular to the plane of the spring 6a and a terminal claw 14 extending the flat 13.

Figure 2:
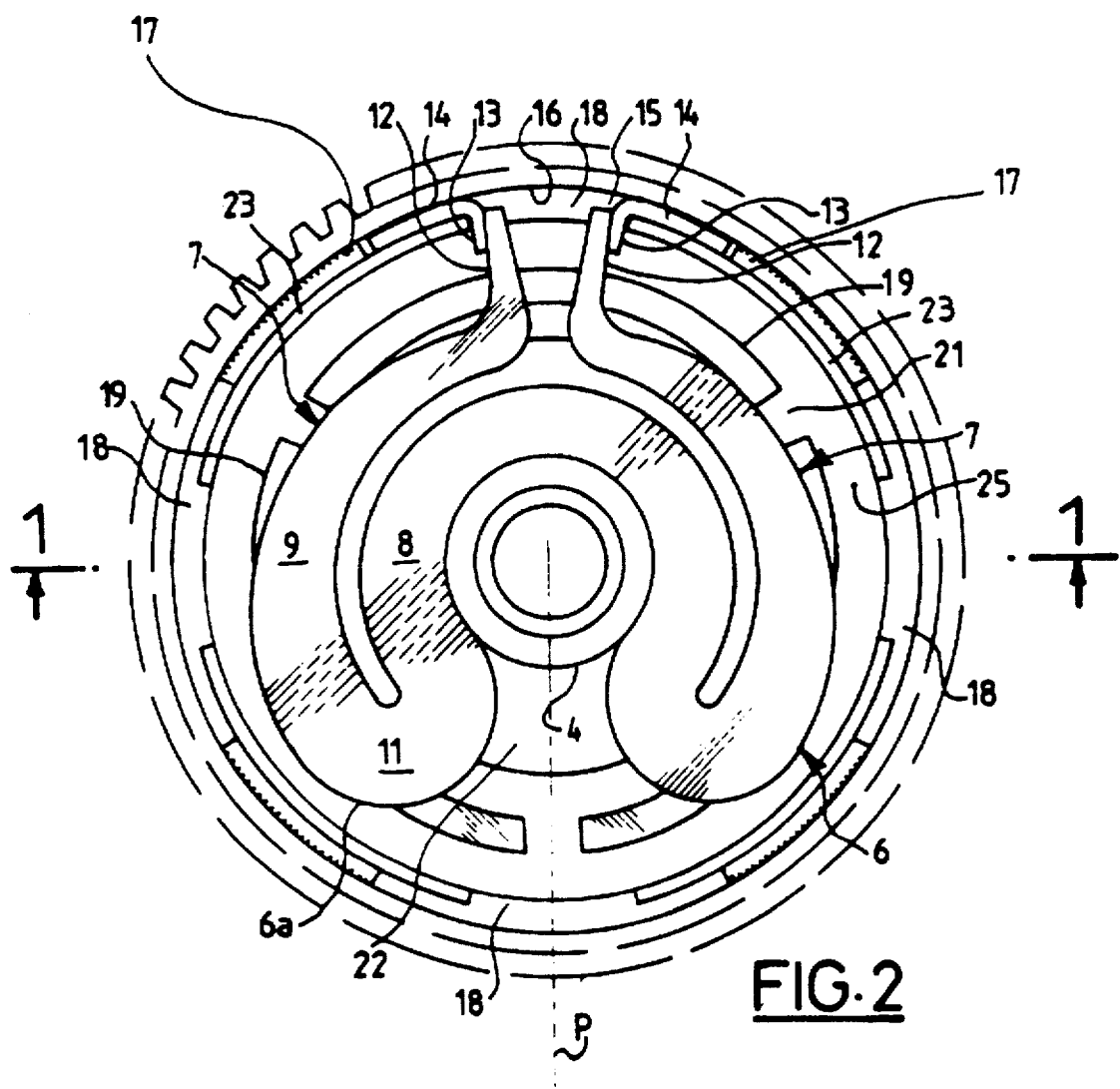
FIG. 2 is an elevation of the damping spring and of the toothed wheel of FIG. 1.
Figure 3:
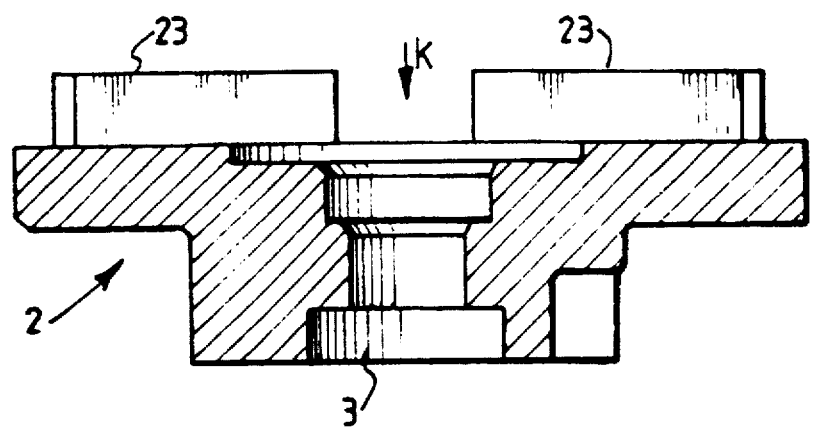
FIG. 3 is a radial section on 3/3 of FIG. 4 of an output member of the motorized reduction gear which can cap the hub of the wheel of FIGS. 1 and 2 and interact with the damping spring.
Figure 4:
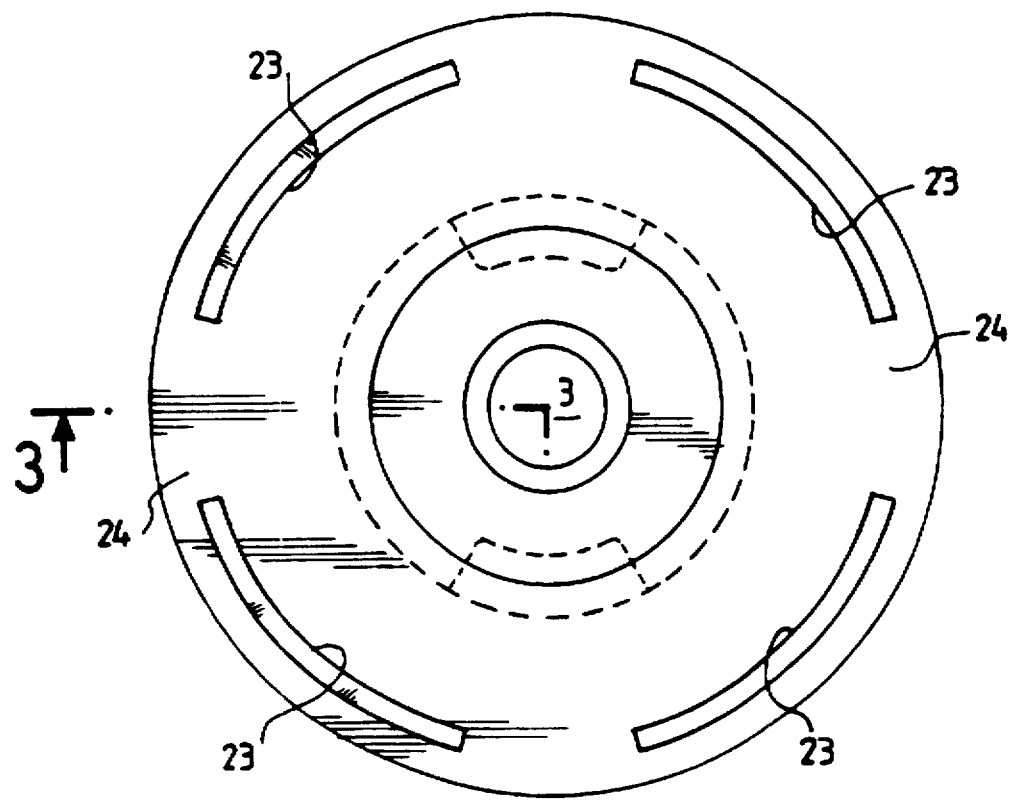
FIG. 4 is an elevation in the direction of the arrow K of FIG. 3.

This claw 14 is curled over approximately at right angles to the flat 13 and extends over a circular sector into a groove 15 defined between the wall 16 of the wheel 1, and circular ribs 17 of the same radius, secured to the hub, and distributed over the inner perimeter of the wheel 1. In the example described, these ribs 17 are four in number, separated by gaps 18. The facing ends of two consecutive ribs 17 form abutment bearings for the flats 13 associated with each branch 7 of the spring 6a (FIG. 2). Other circular ribs 19, separated by gaps 21 and coaxial with the hub 4, are formed between the latter and the ribs 17. The hub 4 is surrounded at its base by an annular part 22 having the same thickness in the axial direction as the ribs 19, and defining, with the latter, a plane bearing face for the spring 6a.

The output member 2 includes, on its face pointing towards the hub 4, several circular ribs 23 of the same radius, extending around the central passage 3 and separated by angular gaps 24. These ribs 23 are dimensioned so that they can penetrate into the groove 25 delimited between the ribs 17 and 19 of the toothed wheel 1. Thus, when the spring 6a is in place, bearing on the annular part 22 and the ribs 19 (FIG. 2), with its two sections 8 which envelop the hub 4 over the greater part of its circumference, the two flats 13 are held bearing on the contiguous ends of the ribs 17, whilst the claws 14 extend into the groove 15 and hold the spring 6a in place. When the output member 2 is fitted onto the hub 4, its ribs 23 penetrate into the groove 25, so that the two facing ends 23a of two adjacent ribs 23 are practically in contact with the flats 13 (FIG. 5).

Several flat springs 6 may be stacked on one another, the end 12 of each of them being anchored in corresponding openings 18. These springs are four in number (6a, 6b, 6c, 6d) in the example represented, it obviously being possible for this number to be varied.

When the window pane is halted in abutment at the end of its path, the output member 2 is abruptly halted in its rotation, whilst the wheel 1 momentarily continues to rotate. This rotational movement of the wheel 1 beyond the halting of the output member 2 gives rise to a relative movement of the wheel 1 and of the member 2: in FIG. 5 it can thus be seen that one of the branches 7 of the spring 6a, depending on the direction of rotation of the wheel 1, for example the right-hand branch 7, is subjected to a force F which moves the radial segment 12, the flat 13 and the claw 14 towards the corresponding parts of the second branch 7, until the wheel 1 is in turn completely halted. Thus, after an angular movement whose amplitude depends on that of the force F and the characteristics of the spring 6a, the claw 14, the flat 13 and the segment 12, as well as the adjacent rib 23 assume the position referenced 14a, 13a, 12a and 23a (FIG. 5) in which the spring 6a undergoes its maximum compression.

Figure 5:
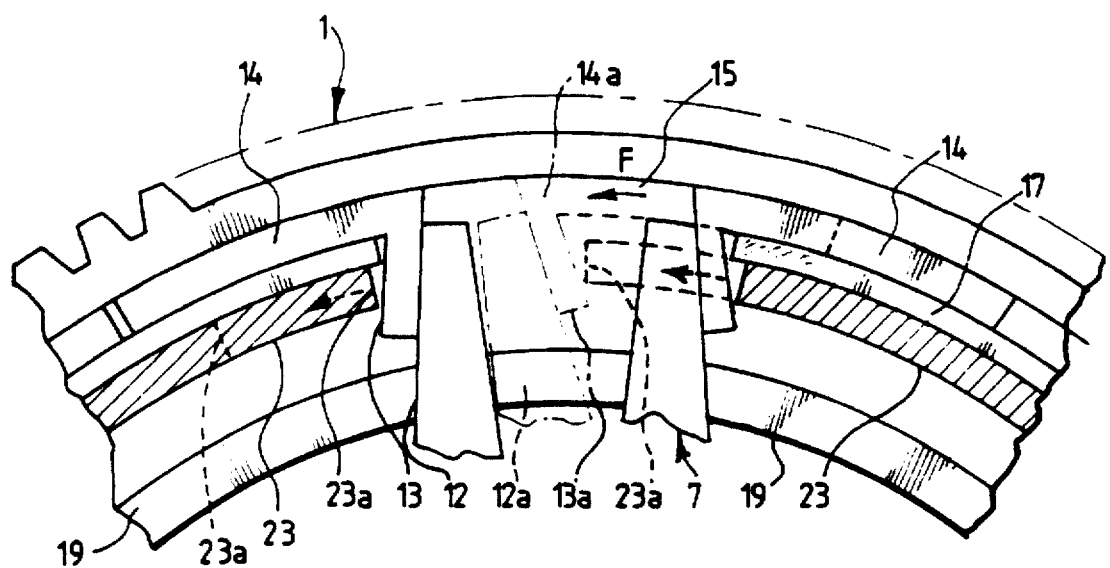
FIG. 5 is a partial elevation on a larger scale, corresponding to FIG. 2, showing the positions of the output member and of one branch of the damping spring before and after the window pane has come into abutment.

Of course, the second rib 23 located to the left in FIG. 5 travels through the same angle as the other rib 23 and comes into the position 23a. The same is the case for the other three springs 6b, 6c, 6d.

The springs 6a, 6b, 6c, and 6d deform freely and store up all of the kinetic energy, which allows them to fulfil completely their function as dampers. They can be produced from a metal or metal alloy with appropriate mechanical characteristics, for example steel. Their operational stability and durability are very much greater than those of the rubber or plastic dampers of the prior art recalled above. The bearing of the ends 12, 13 of the springs 6 on the ribs 17 may be produced by any arrangement equivalent to the one represented.

The motorized reduction gear equipped with the damping system according to the invention may be used for driving various pieces, particularly vehicle accessories such as window panes.

We claim:

1. A window assembly including a motorized reduction gear assembly for use with a vehicle electric window lifter which is utilized to lift a window, comprising:

a window;

a tooth driving wheel having a hub;

an output means fitted onto the hub and connected to drive said window;

damping means mounted on said hub and mechanically interposed between the toothed driving wheel and the output means, wherein rotational movement of the tooth driving wheel is translated in rotational movement of the output means which, in turn, is translated into linear movement of said window, and wherein rotational movement of the output means is abruptly halted when said window ceases linear movement, said motorized reduction gear assembly being characterized in that the damping means comprises at least one spring adapted to deform freely and store up all the kinetic energy residual in said tooth driving wheel, said spring having a central portion received about and engaging said hub and a second portion, radially spaced from said central portion, that is compressingly deformed when said tooth driving wheel urges further rotational movement of the reduction gear assembly after said output means has ceased rotational movement.

2. A motorized reduction gear according to claim 1 wherein said damping means comprises a plurality of superimposed flat springs (6a ... 6d), wherein each said spring is interposed between said toothed driving wheel and said output means such that each said spring is deformed when said toothed driving wheel urges further rotational movement of the gear reduction assembly after the output means has ceased rotational movement.

3. A motorized reduction gear according to claim 1 wherein said damping means comprises a flat metal damping spring (6).

4. A motorized reduction gear assembly comprising:

a driving gear having a hub;

an output member rotationally driven by said driving gear;

a damping spring mechanically interposed between said gear and said output member, said damping spring having a first portion positioned to engage said hub for mounting said spring to said hub and a second portion including two spring arms;

said driving gear including retainers for engaging said spring arms and for securing said spring rotationally with respect to said driving gear;

said output member including interfering tabs for selectively contacting said spring arms;

said interfering tabs contacting one of said spring arms and causing said one spring arm to be displaced away from its corresponding said retainer when a rotational differential exists between said output member and said driving gear, said displacement of said one spring arm causing said spring to store kinetic energy resulting from the rotational differential between the output member and the driving gear, wherein one of said spring arms is displaced when said driving gear is rotating in a first direction relative to said output member and wherein the other of said spring arms is displaced when said driving gear is rotating in a second direction relative to said output member.

5. An assembly as set forth in claim 4 including a plurality of springs, each said spring mounted to said hub and retained rotationally with respect to said driving gear by said retainers, wherein one of each spring's arm ends are displaced when said driving gear is rotating clockwise with respect to said output member and wherein the other of each spring's arm ends are displaced when said driving gear is rotating counterclockwise with respect to said output member.

6. A motorized reduction gear assembly for use with a vehicle electric window lifter, comprising:

a toothed driving wheel having a hub;

an output means fitted onto said hub and having at least two coaxial circular ribs;

damping means mounted on said hub and mechanically interposed between said toothed driving wheel and said output means;

wherein rotational movement of the toothed driving wheel is translated into rotational movement of the output means which, in turn, is translated into linear movement of a window;

wherein rotational movement of the output means is abruptly halted when the window ceases linear movement;

wherein said damping means comprises at least one spring adapted to deform freely and store up all the kinetic energy residual in said toothed driving wheel, said spring being compressingly deformed when said toothed driving wheel urges further rotational movement of the gear reduction assembly after said output means has ceased rotational movement, and wherein said spring includes two flexible branches which are symmetrical with one another with respect to a median plane, each said branch including a convolution having a first section of which is shaped to bear on said hub and having a second, curved section which is connected by a fold to said first section, said second section having a terminal part cut so as to constitute a flat, said spring flats being adapted to bear against said coaxial circular ribs on said output means when said spring is storing kinetic energy from said toothed driving wheel; and wherein one of said spring flats bears against a corresponding one of said circular ribs when said toothed driving wheel is rotating in a first direction, and wherein the other one of said spring flats bears against a corresponding one of said circular ribs when said tooth driving wheel is rotating in a second direction.

7. A motorized reduction gear assembly according to claim 6, wherein said flats of said branches are connected to said second, curved sections of said branches by a radial segment.

8. A motorized reduction gear assembly according to claim 6, wherein said toothed driving wheel has an outer peripheral wall and wherein said toothed driving wheel further includes at least two inner ribs, said inner ribs and said outer peripheral wall delimiting a groove, said motorized reduction gear further including at least two terminal claws, each said terminal claw being adapted to be inserted into said groove and to interact with a corresponding said contiguous flat of said spring to hold said spring in place on said hub.

* * * * *